(12) United States Patent
Brown

(10) Patent No.: US 8,795,779 B2
(45) Date of Patent: Aug. 5, 2014

(54) METHOD OF TREATING AN ARTICLE WITH A FLUOROCARBON

(75) Inventor: James F. Brown, Clifton, VA (US)

(73) Assignee: Cytonix LLC, Beltsville, MD (US)

( * ) Notice: Subject to any disclaimer, the term of this patent is extended or adjusted under 35 U.S.C. 154(b) by 90 days.

(21) Appl. No.: 12/874,346

(22) Filed: Sep. 2, 2010

(65) Prior Publication Data

US 2010/0330293 A1 Dec. 30, 2010

Related U.S. Application Data

(62) Division of application No. 11/086,070, filed on Mar. 22, 2005, now Pat. No. 7,806,073.

(51) Int. Cl.
*B01D 47/05* (2006.01)

(52) U.S. Cl.
CPC .................................. *B01D 47/05* (2013.01)
USPC ........ 427/345; 427/430.1; 134/108; 134/109; 134/110; 134/111

(58) Field of Classification Search
USPC .............................................. 427/345, 430.1
See application file for complete search history.

(56) References Cited

U.S. PATENT DOCUMENTS

| | | | |
|---|---|---|---|
| 2,241,176 A | 5/1941 | Boecler et al. ................... | 425/74 |
| 2,810,952 A | 10/1957 | Barnebey ....................... | 427/341 |
| 3,561,130 A * | 2/1971 | Galitz .............................. | 34/449 |
| 3,565,039 A | 2/1971 | Ramer ........................... | 118/643 |
| 3,830,382 A | 8/1974 | Nagamori ...................... | 414/618 |
| 4,007,304 A * | 2/1977 | Dunn et al. .................... | 427/314 |
| 4,012,847 A * | 3/1977 | Rand ............................... | 34/75 |
| 4,258,649 A | 3/1981 | Dunn et al. ...................... | 118/61 |
| 4,265,642 A | 5/1981 | Mir et al. ......................... | 95/154 |
| 4,400,414 A * | 8/1983 | DeMott .......................... | 427/210 |
| 4,444,573 A | 4/1984 | Cosper et al. ................... | 95/207 |
| 4,616,594 A | 10/1986 | Itho ............................... | 118/326 |
| 4,834,020 A | 5/1989 | Bartholomew et al. ........ | 118/719 |
| 4,941,182 A | 7/1990 | Patel ............................. | 382/141 |
| 5,284,518 A * | 2/1994 | Kohn ............................. | 118/324 |
| 5,957,393 A | 9/1999 | Price ............................. | 239/854 |
| 5,976,629 A * | 11/1999 | Wood .......................... | 427/385.5 |
| 6,010,562 A | 1/2000 | Flynn et al. ..................... | 96/125 |
| 6,044,964 A | 4/2000 | Krupa et al. ................... | 198/794 |
| 2002/0005273 A1 * | 1/2002 | Schermutzki et al. .......... | 165/86 |
| 2005/0196263 A1 | 9/2005 | Tamura ....................... | 414/744.5 |

* cited by examiner

*Primary Examiner* — Mandy Louie
(74) *Attorney, Agent, or Firm* — Kilyk & Bowersox, P.L.L.C.

(57) ABSTRACT

A system and method is shown for coating an article, including a chamber that can be at least partially open to surrounding air to allow free flow of air through the chamber and recovery of vapor produced during a coating operation within the chamber. The chamber can include a support surface that is adapted to support the article during a coating process, and a coating device within the chamber can be adapted to selectively apply a coating of a fluorocarbon in a fluorinated solvent to at least a portion of an article supported on the support surface.

6 Claims, 2 Drawing Sheets

METHOD OF TREATING AN ARTICLE WITH A FLUOROCARBON

CROSS-REFERENCE TO RELATED APPLICATION

The present application is a divisional of U.S. patent application Ser. No. 11/086,070, filed Mar. 22, 2005, which issued on Oct. 5, 2010, as U.S. Pat. No. 7,806,073 B2, and which is incorporated herein in its entirety by reference.

INTRODUCTION

The teachings of the present application relate to methods and apparatus for coating an article.

Hydrophobic coatings are useful for many applications, for example, to prevent rain from wetting-out or collecting on a windshield. Another application of hydrophobic coatings is in the field of laboratory vessels. Laboratory vessels including chambers, microtiter plates, vials, flasks, test tubes, syringes, microcentrifuge tubes, pipette tips, selectively coated microscope slides, coverslips, films, porous substrates and assemblies comprising such devices are often used to handle, measure, react, incubate, contain, store, restrain, isolate, and/or transport very precise and sometimes minute volumes of liquid, often biological samples. When samples are quantitatively analyzed, it can be of critical importance that precise and representative amounts of sample are transferred, or else inaccurate results are obtained. Due to the different affinities of some materials to adhere to the walls of a laboratory vessel, qualitative analyses, such as concentrations of materials may also be adversely affected if certain materials in a sample selectively adhere to operational surfaces of the vessel walls.

Unfortunately, materials typically used in the manufacture of laboratory vessels do not sufficiently repel many biological sample fluids nor do they sufficiently resist the adherence of molecular constituents of such a sample fluid. The sample fluids often wet the surface of the vessel causing residual quantities of liquid sample to cling to an operational surface of the vessel when the sample is removed. In some cases, significant quantitative and/or qualitative errors result. It is therefore desirable to provide extremely hydrophobic coatings for laboratory vessels which will reduce the wetting of the operational surfaces of the vessels and reduce clinging by even the most adherent samples so that virtually no sample remains in the vessel when poured, ejected, or vacuumed therefrom.

Fluoroalkyl polymers have been used to produce oleophobic, hydrophobic membrane surfaces that are not wetted by common organic solvents. Membranes coated with such polymers are disclosed in U.S. Pat. No. 4,954,256 to Degen et al. These membranes have surface energies ranging from about 6 to about 15 dynes/cm but require a manufacturing procedure which involves soaking a membrane with a solution containing polymerizable monomers, exposing the solution/wetted membrane to high doses of ionizing radiation, and then washing the ionized membrane with organic solvent to remove unreacted monomer. While no attempts are known to coat laboratory vessels by such a procedure, it is expected that difficulties would arise as well as high cost in coating such vessels because of the sheer bulk of the polymerizable solution to be irradiated and problems with fully washing the coated vessel.

Methods of making disposable, one-time use laboratory vessels such as pipette tips can involve a substantial loss of costly solvent when a coating solution is used to form a hydrophobic coating. A need exists for a process of coating laboratory vessels at a cost of a few cents per thousand with an insignificant loss of solvent.

The Renzacci Company of Italy manufactures perchloroethylene-based cleaning machines that are widely recognized to be among the best in the industry in terms of minimum solvent loss. But loaded with sixty thousand pipette tips in mono-filament mesh bags and using Renzacci's standard automated programs, these machines lose about five pounds of FC84 (3M Company, St. Paul, Minn.) per cycle. This translates to solvent consumption costs of over $1.00 per thousand tips. Higher boiling point fluorocarbon solvents have lower loss rates, but the solvent expense is about the same due to their higher cost per pound.

The Renzacci standard automated program partially fills a cleaning/coating tank of approximately one-half cubic meter with solvent at ambient temperature from a solvent reservoir. Articles in the tank are then tumbled in the solvent for several minutes, followed by drain, spin, and spin-rinse cycles. With continuing tumbling, a heat pump and a supplementary heat source (electric, steam, etc.) heat air blown through the tank, while passing air returns from the tank over chilled condensation coils where solvent vapor is liquified and returned to the reservoir. Water is circulated through the heat pump system to remove excess heat. However, the temperature in the tank can still rise to over 50° C. and the reservoir temperature can rise to more than 30° C. At the end of the process cycle, heating is discontinued and the tank and reservoir are cooled to about 30° C. When the tank door is opened to remove the cleaned/coating articles, a small blower draws air out of the tank through a carbon filter in order to reduce the odor of remaining perchloroethylene solvent. Unfortunately, at 30° C., the solvent FC84 has a vapor pressure of over one fifth atmosphere, and the half cubic meter tank volume contains about two pounds of solvent as dense vapor (about 14 times that of air), even without agitation. Opening the tank door results in the immediate loss of this material.

SUMMARY

According to various embodiments, a system for coating an article is provided that comprises a chamber at least partially open to a surrounding environment to enable a flow of environmental gas or air through the chamber and recovery of vapor produced during a coating operation within the chamber. The chamber can be provided with at least one support surface that can be adapted to support the article during a coating process. At least one coating device can be provided within the chamber and can be adapted to selectively apply a solution of a fluorocarbon in a fluorinated solvent to at least a portion of an article supported on the support surface, to form a coating on at least the portion. The at least one coating device in the chamber can be adapted to spray a solution of a fluorocarbon in a fluorinated solvent on at least a portion of an article supported on the support surface. According to various embodiments, the at least one coating device can be adapted to dip at least a portion of an article into a solution comprising a fluorocarbon in a fluorinated solvent. The coating device according to various embodiments can be adapted to draw a solution of fluorocarbon in a fluorinated solvent over and in contact with at least a portion of an article supported on the support surface, for example, using a negative pressure or suction created within the chamber. It is to be understood that the solution of fluorocarbon in fluorinated solvent described herein can instead comprise a mixture, suspension, emulsion, or other composition of fluorocarbon in a fluorinated solvent, but is herein referred to as a solution or composition.

A method of treating an article according to various embodiments comprises providing a chamber that is at least partially open to a surrounding environment, for example, to surrounding air, to enable a free flow of gas or air through the chamber, wherein the chamber comprises a support surface therein. An article can be supported on the support surface to be treated within the chamber. A free flow of air can be maintained through the chamber and around the article supported on the support surface, and the article can be treated by selectively exposing part or all of the article to a fluorocarbon in the fluorinated solvent. According to various embodiments, the method can comprise coating a sheet, film, roll, or web of material, for example, as it is unrolled off of a supporting roller. The coated sheet, film, roll, or web can be dried and/or cured and then rolled up onto the same or a different supporting roller inside or outside of the chamber.

According to various embodiments, a method of applying a coating composition can be provided that comprises providing an array of individually removable lab vessels or other articles, and selectively applying a coating composition of a fluorocarbon in a fluorinated solvent to one or more of the array of lab vessels or articles to coat a portion or the entirety of the one or more lab vessels or articles of the array.

According to various embodiments, an apparatus for applying a coating composition can be provided that comprises means for supporting an array of lab vessels or other articles, with each lab vessel or other article being individually removable from the array, and means for selectively applying a coating composition of a fluorocarbon in a fluorinated solvent to one or more of the lab vessels or other articles to coat a portion or the entirety of the lab vessels or other articles of the array.

It is to be understood that both the foregoing general description and the following detailed description are exemplary and explanatory only and are intended to provide a further explanation of the present teachings.

BRIEF DESCRIPTION OF THE DRAWINGS

The skilled artisan will understand that the drawings described below are for illustration purposes only. The drawings are not intended to limit the scope of the present teachings in any way.

DESCRIPTION OF VARIOUS EMBODIMENTS

Figure 1:
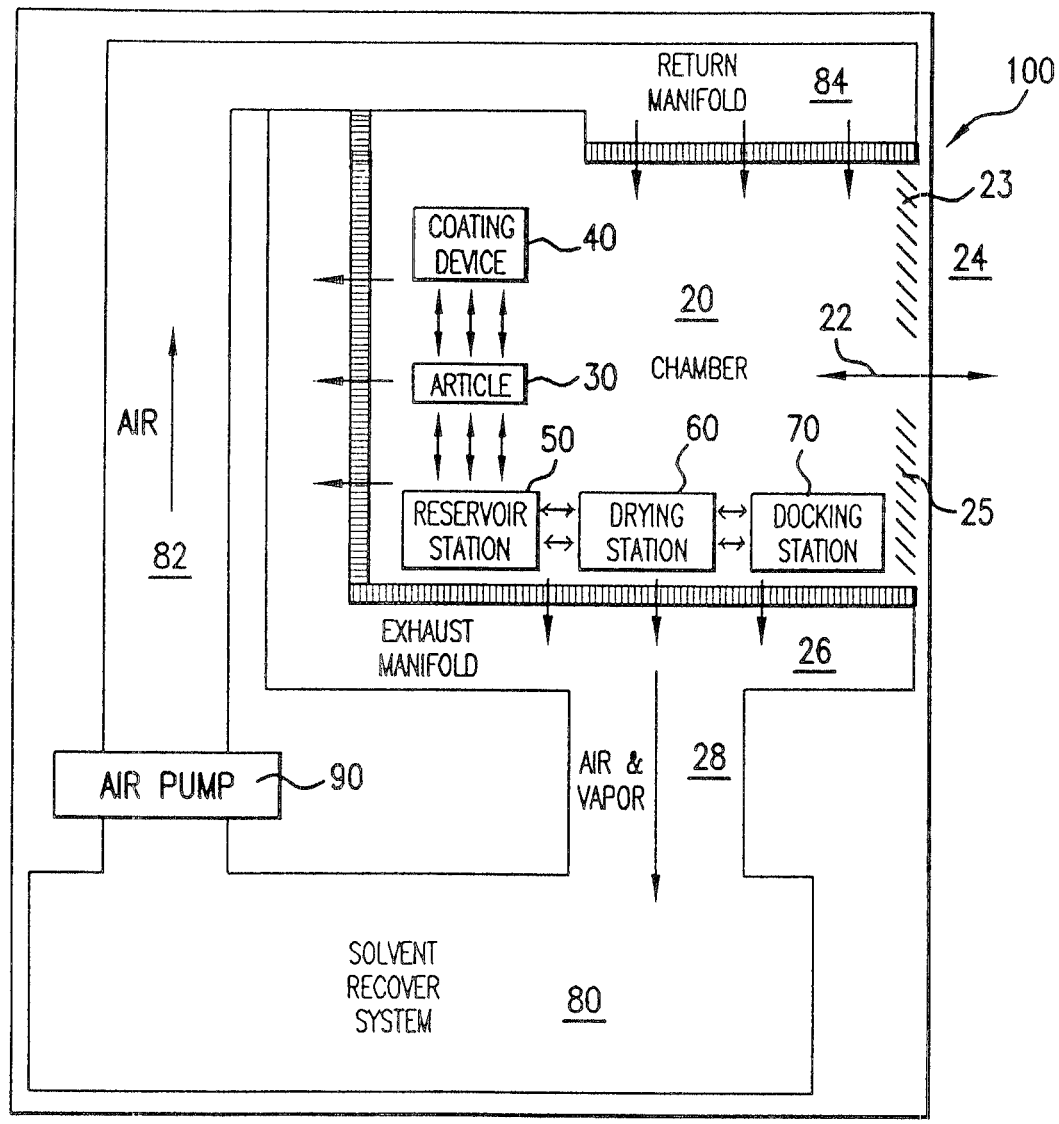
FIG. 1 illustrates a schematic diagram of a system for coating an article according to various embodiments.

According to various embodiments, a system for coating an article can be provided. The system can include a chamber that is at least partially open to the surrounding environment to enable free flow of environmental gas or air through the chamber and recovery of vapor produced during a coating operation within the chamber. As shown in FIG. 1, the system 100 can include a chamber 20 that is at least partially open through an opening 22 to the surrounding ambient air 24. Baffles or partitions 23, 25 can be provided across the opening 22 to provide further control of atmospheric exchange between the interior of chamber 20 and the surrounding ambient air 24. The chamber 20 can include various devices and/or stations such as a coating device 40, a reservoir station 50, a drying station 60, and a docking station 70. An article 30 to be coated can be movable between the various stations, for example, movable on a conveyor belt or by a robotic handling device. The chamber 20 can be in fluid communication with an exhaust manifold 26 that can at least partially surround the chamber 20, and that can provide a pathway for air and vapor produced within the chamber 20, during a coating operation, to exit through an exit duct 28 and into a solvent recovery system 80.

Various devices or means can be provided for moving the article 30 within the chamber 20. Although not shown in FIG. 1, a robotic assembly or other conveyor means could be provided for initially moving the article 30 to a position to be docked prior to treatment by the coating device 40. The robotic assembly or conveyor device can then move the article 30 and/or coating device 40 to the reservoir station 50 during the coating process. The robotic assembly or conveyor can then move the article 30 to the drying station 60 and return the coating device to its original position. After the article 30 has been dried at the drying station 60, the article can be moved to the docking station 70, from which the coated article can then be retrieved for removal from the chamber 20. The robotic assembly can comprise a robotic arm mechanism that is adapted to grasp the article or array of articles and move the article or articles between the various stations and/or devices. Alternatively, the robotic assembly can comprise a conveyor belt adapted to move the article or articles between the various stations and/or devices within the chamber 20. An alternative arrangement can comprise protective sleeves or other protective device for allowing a user to reach into the chamber 20 to manipulate the article or articles between the various devices and/or stations, while avoiding contact with the coating composition and/or fumes produced during the coating process.

The open configuration of chamber 20 allows for an article or articles 30 to be placed in or removed from the chamber 20 through the opening 22, while at the same time maintaining an air flow from ambient air 24 through the chamber opening 22 and past baffles or partitions 23, 25, and past the article or articles 30, as the article or articles are moved between the various devices and stations, for example, between the coating device 40, reservoir station 50, drying station 60, and docking station 70.

Air that is drawn through the chamber 20 during a coating operation collects any solvent that remains in the form of a vapor after the coating operation and draws the air and solvent vapor through the exhaust manifold 26, the exhaust duct 28, and into the solvent recovery system 80. The solvent recovery system 80 can include a chiller that lowers the temperature so as to cause condensation of the solvent into a liquid form that can be easily recovered. An air pump 90 can draw the air from the solvent recovery system after recovery of the solvent vapor, with the air being directed through a downstream duct 82, and through a return manifold 84 back into the chamber 20. The constant circulation of air into the chamber 20 and out through exhaust manifold 26 to the solvent recovery system 80 ensures that any solvent vapor produced during the coating operation within chamber 20 can be recovered.

According to various embodiments, an article or articles 30 within chamber 20 can be supported and docked to the coating device 40, and then be moved to the reservoir station 50. At the reservoir station 50, the article or articles 30 can be filled with a coating composition from the reservoir station 50, and then the fluid can be withdrawn from the articles leaving only the desired coating behind on the articles. According to various embodiments, the article or articles can be dipped into and then removed from a coating composition at the reservoir station 50.

As discussed in U.S. Pat. No. 6,767,587, which is herein incorporated in its entirety by reference, an extremely hydrophobic coating can be formed on the surface of an article. The coating can comprise, for example, the reaction product of a reactant containing a terminal trifluoromethyl group. Articles such as laboratory vessels to be coated according to a process of the present teachings, can comprise, for example, plastic, metal, or glass, and can include any of the tubes, vials, slides, microcentrifuge tubes, test tubes, pipettes, pipette tips, or other vessels described in U.S. Pat. No. 6,767,587. Exemplary materials of laboratory vessels that can be coated according to various embodiments can include polypropylene, polyethylene, polyethyleneterephthalate, polystyrene, polycarbonate, and cellulosic materials. According to various embodiments, the articles can comprise plastics such as polytetrafluoroethylene or other fluorinated polymers. Any of many different coatings of a fluorocarbon in a fluorinated solvent, such as those disclosed in U.S. Pat. No. 6,767,587, can be applied to the article or articles at the reservoir station 50. The articles can then be moved to the drying station 60 while the surrounding ambient air 24 is drawn through the opening 22 into chamber 20, past the articles at the drying station, and into exhaust manifold 26. After the articles have been dried they can then be moved to the docking station 70 for ready removal from the chamber 20.

According to various embodiments, the article 30 docked to coating device 40 can be moved to the reservoir station 50 and sprayed with a fluid from the reservoir station 50 to provide a desired coating. The spraying can be performed by one or more nozzles if provided as part of the coating device, and the coating composition can be directed to selected areas of the article or articles, and then the article or articles can be moved to the drying station 60. The coating device can be returned to its original position, ready to perform a spraying or coating operation on additional articles. After drying at the drying station 60, the article or articles can be moved by a robotic assembly, or by being placed on a conveyor belt. Placement can occur manually using gloves, or through other handling means, to achieve placement at the docking station 70 from which the article or articles can be retrieved automatically or manually for removal from the chamber 20.

According to various embodiments, the article 30 can be coated by being dipped, at least partially, into a coating composition provided at the reservoir station 50, to selectively apply a coating to the entirety of or to only a portion of the article. After such a dipping operation, the article or articles can then be moved to the drying station 60 and then to the docking station 70.

According to various embodiments, an air pump 90 can be provided downstream of the solvent recovery system 80 and can be used to create a suction or pressure differential that draws ambient air 24 through the chamber, past the coating station, through the exhaust manifold 26, and into the solvent recovery system 80. After solvent in vapor form has been removed from the air and vapor mixture drawn in from the chamber 20, the clean air can then be directed through the return duct 82 and return manifold 84, back into the chamber 20.

According to various embodiments, the article 30 within chamber 20 can be supported on a support surface that includes openings therethrough in communication with the exhaust manifold 26, such that a pressure differential created between the chamber and the solvent recovery system 80 results in ambient air moving past the article on the support surface. The moving air can carry with it solvent vapor generated from the coating operation and direct the solvent vapor into the solvent recovery system 80.

According to various embodiments, a method of applying a coating to an article can comprise coating an array of individually removable lab vessels or other articles, for example, an array of centrifuge tubes or test tubes disposed in a rack. A coating composition, for example, a solution of fluorocarbon in a fluorinated solvent, can be selectively applied to one or more of the lab vessels of the array to coat a portion or the entirety of the one or more lab vessels within the chamber 20. The array of lab vessels or other articles can be provided in an array support comprising a plurality of openings, each sized to accommodate a respective one of the individually removable lab vessels, for example, a rack. The application of the coating composition to at least a portion of one or more articles supported within the array can be achieved by selectively inserting a spray nozzle, or a plurality of spray nozzles, partially or fully into selected ones or all of the articles within the array, or by directing spray from one or more spray nozzles at the desired portions of the one or more articles within the array.

The coating operation performed within chamber 20 can be conducted while maintaining a constant flow of air through the chamber and into the exhaust manifold 26, or, alternatively, the air flow can be regulated or changed before, during, and/or after a coating operation.

According to various embodiments, the article to be coated can be a moving web of material, a continuous web of material, or a moving and continuous web of material. According to various methods, the web can be coated with a system such as that illustrated in FIG. 2. The entire system shown in FIG. 2 can be incorporated and housed inside a chamber, for example, chamber 20 shown in FIG. 1. Alternatively, the supply and/or take-up rolls for the web of material can be located outside of a coating chamber while the coating composition supply nozzle and support surface are located within a chamber.

Figure 2:
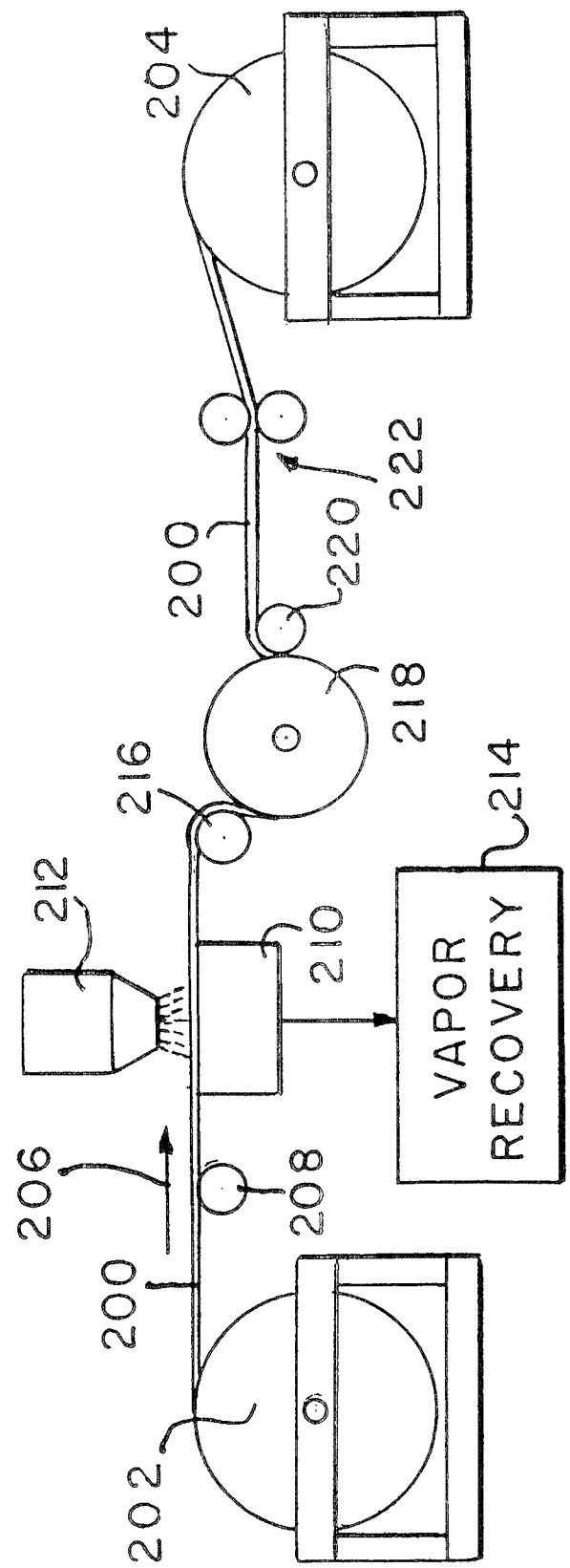
FIG. 2 illustrates a side view of a system including a support surface and an article to be coated in the form of a rolled web of material.

As illustrated in FIG. 2, a web of material 200 can be supplied from a supply roll 202 and taken-up by a take-up roll 204. The web 200 can move in the direction shown by arrow 206 over a support roller 208 and over a support surface 210. A coating composition supply nozzle 212 can be arranged on a side of the web 200 opposite the side supported by support surface 210. The coating composition supply nozzle 212 can be connected to a supply or source of a coating composition and can apply a coating composition to the top surface of web 200, for example, while the web 200 is moved in the direction shown by arrow 206. Alternatively, portions of the web can be coated stepwise in between advancing motions of the web, for example, while the web is held momentarily stationary. The support surface 210 can comprise a porous surface or otherwise include holes or apertures through which excess coating composition and coating composition solvent can be drawn and directed to a vapor recovery system 214. After passing over the support surface 210, the coated web can then pass over a second support roller 216 and around a heated curing roller 218. After contacting the heated curing roller 218, the coated web can be guided by another support roller 220 and directed toward a pair of nip rollers 222 before being taken-up by the take-up roller 204.

According to various embodiments, if the article to be coated can comprise a web of material, the web of material can comprise a paper web, a plastic web, a foil web, a textile web, a woven web, an elastomeric web, or the like. In some embodiments, a web is coated that can comprise a roll of carpet or a roll of fabric. In some embodiments, unrolled fragments or sections of a rolled material can be passed through a coating station adapted to recover fluorinated solvent vapor.

Other embodiments of the present invention will be apparent to those skilled in the art from consideration of the present specification and practice of the present teachings disclosed herein. It is intended that the present specification and examples be considered as exemplary only.

What is claimed is:

1. A method of treating an article, comprising:
providing a chamber that is at least partially open to surrounding air to allow a free flow of air through the chamber, the chamber having a support surface therein;
supporting an article to be treated on the support surface within the chamber;
maintaining a flow of air through the chamber and around the article supported on the support surface;
treating the article by selectively exposing part or all of the article to a composition comprising a coating solution of a fluorocarbon in a fluorinated solvent, the treating causing a coating of the fluorocarbon to be formed on the article and producing solvent vapor within the chamber;
exhausting the solvent vapor from the chamber by moving the solvent vapor from within the chamber through an exhaust manifold and exhaust duct that are in fluid communication with the chamber, to a solvent recovery system, the moving being effected by an air pump configured to draw air and the solvent vapor through the exhaust manifold and exhaust duct and into the solvent recovery system, wherein the support surface is provided with at least one opening and the vapor produced during the treating of the article is drawn down through the at least one opening in the support surface and around the article to a vapor condensing area of the solvent recovery system; and
recovering the solvent vapor in the solvent recovery system by chilling the solvent vapor with a chiller to condense the solvent vapor into fluorinated solvent in liquid form.

2. The method of claim 1, wherein the article is treated by dipping at least a portion of the article into the fluorocarbon in a fluorinated solvent while maintaining the free flow of air through the chamber.

3. The method of claim 1, wherein the recovering the solvent vapor produced during the treating of the article comprises generating a pressure differential between the inside of the chamber and the solvent recovery system.

4. The method of claim 1, wherein the article comprises a roll of material and the method comprises one or more of rolling up and unrolling the roll of material.

5. The method of claim 1, further comprising returning air and any uncondensed solvent vapor through a return duct, through a return manifold, and into the chamber.

6. The method of claim 1, wherein the coating of the fluorocarbon comprises a reactant having a terminal trifluoromethyl group.

* * * * *